US012769645B2

(12) United States Patent
Parackal Saby et al.

(10) Patent No.: US 12,769,645 B2
(45) Date of Patent: Oct. 20, 2026

(54) WORKLOAD-BASED NETWORK-ACCESSIBLE MEMORY POOL PROVISIONING SYSTEM

(71) Applicant: Dell Products L.P., Round Rock, TX (US)

(72) Inventors: Vinod Parackal Saby, Bangalore (IN); Krishnaprasad Koladi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/963,908

(22) Filed: Nov. 29, 2024

(65) Prior Publication Data

US 2026/0154191 A1 Jun. 4, 2026

(51) Int. Cl.
*G06F 12/02* (2006.01)

(52) U.S. Cl.
CPC .................................. *G06F 12/023* (2013.01)

(58) Field of Classification Search
None
See application file for complete search history.

(56) References Cited

U.S. PATENT DOCUMENTS 10,140,066 B2 * 11/2018 Gupta ................... G06F 3/0613
10,834,189 B1 * 11/2020 Chopra ............... H04L 67/1012
10,908,940 B1 * 2/2021 Farhan .................... H04L 67/10
2014/0068624 A1 * 3/2014 Fuller ................... G06F 9/5011
718/104
2015/0256432 A1 * 9/2015 Agarwala ............... G06F 3/067
709/214
2021/0019187 A1 * 1/2021 White ................... G06F 3/0689
2021/0377150 A1 * 12/2021 Dugast .................. H04L 45/125
2022/0050722 A1 * 2/2022 Dugast .................. G06F 9/4406
2022/0066827 A1 * 3/2022 Tavallaei .............. G06F 9/5077
2025/0077093 A1 * 3/2025 Jung ..................... G06F 3/0619

OTHER PUBLICATIONS

Jacob Wahlgren, Maya Gokhale, Ivy B. Peng. "Evaluating Emerging CXL-enabled Memory Pooling for HPC Systems." Nov. 4, 2022. arXiv:2211.02682v1. https://doi.org/10.48550/arXiv.2211.02682 (Year: 2022).*

* cited by examiner

*Primary Examiner* — Yaima Rigol
(74) *Attorney, Agent, or Firm* — Joseph Mencher

(57) ABSTRACT

A workload-based network-accessible memory pool provisioning system includes a computing device. A memory pool provisioning subsystem in the computing device identifies a workload type for a workload and, based on the workload type, configures a network-accessible memory pool using network-accessible memory devices coupled to the computing device via a network, and exposes the network-accessible memory pool for use in performing the workload. An operating system provided by the computing device uses the exposed network-accessible memory pool to perform the workload using a first subset of the network-accessible memory devices. A memory orchestration subsystem in the computing device monitors the performance of the workload by the operating system and, in response, modifies the performance of the workload by the operating system such that the operating system performs the workload using a second subset of the network-accessible memory devices that is different than the first subset of the network-accessible memory devices.

20 Claims, 9 Drawing Sheets

300

WORKLOAD-BASED NETWORK-ACCESSIBLE MEMORY POOL PROVISIONING SYSTEM

BACKGROUND

The present disclosure relates generally to information handling systems, and more particularly to providing a network-accessible memory pool based on a workload performed by an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, may be configured to utilize network-accessible memory devices such as, for example, Compute express Link (CXL) memory devices. However, the inventors of the present disclosure have recognized that conventional CXL memory systems provide CXL memory devices for use by computing devices without considering the workloads that those computing devices will be performing using those CXL memory devices, the variety of CXL memory devices that are available, and/or other details of the CXL memory devices and/or their use. As such, the full benefits provided by the use of CXL memory devices (e.g. CXL memory pools and associated caches that provide a high-speed, low-latency cache/memory coherency infrastructure that may be used by hosts, peripheral devices, and end point devices) may not be taken advantage of by computing devices when performing their workloads.

Accordingly, it would be desirable to provide a workload-based network-accessible memory pool provisioning system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a memory pool provisioning engine that is configured to: identify a workload type for a workload; configure, based on the workload type, a network-accessible memory pool using a plurality of network-accessible memory devices that are coupled to the processing system via a network; and expose the network-accessible memory pool for use in performing the workload, wherein the memory system includes instructions that, when executed by the processing system, cause the processing system to provide an operating system engine that is configured to: perform, using the network-accessible memory pool exposed by the memory pool provisioning engine, the workload using a first subset of the plurality of network-accessible memory devices; and wherein the memory system includes instructions that, when executed by the processing system, cause the processing system to provide a memory orchestration engine that is configured to: monitor the performance of the workload by the operating system engine and, in response, modify the performance of the workload by the operating system engine such that the operating system engine performs the workload using a second subset of the plurality of network-accessible memory devices that is different than the first subset of the plurality of network-accessible memory devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
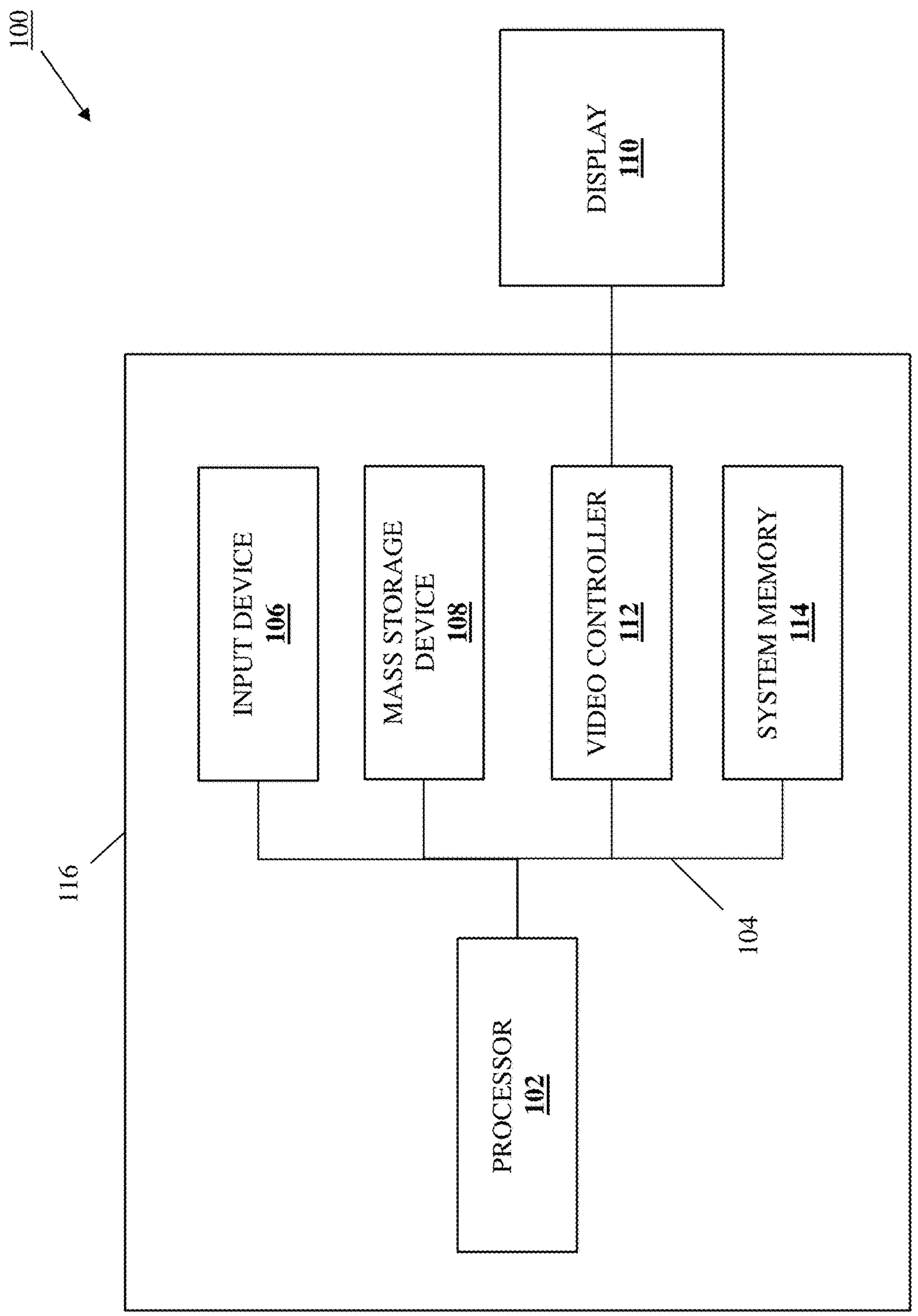
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
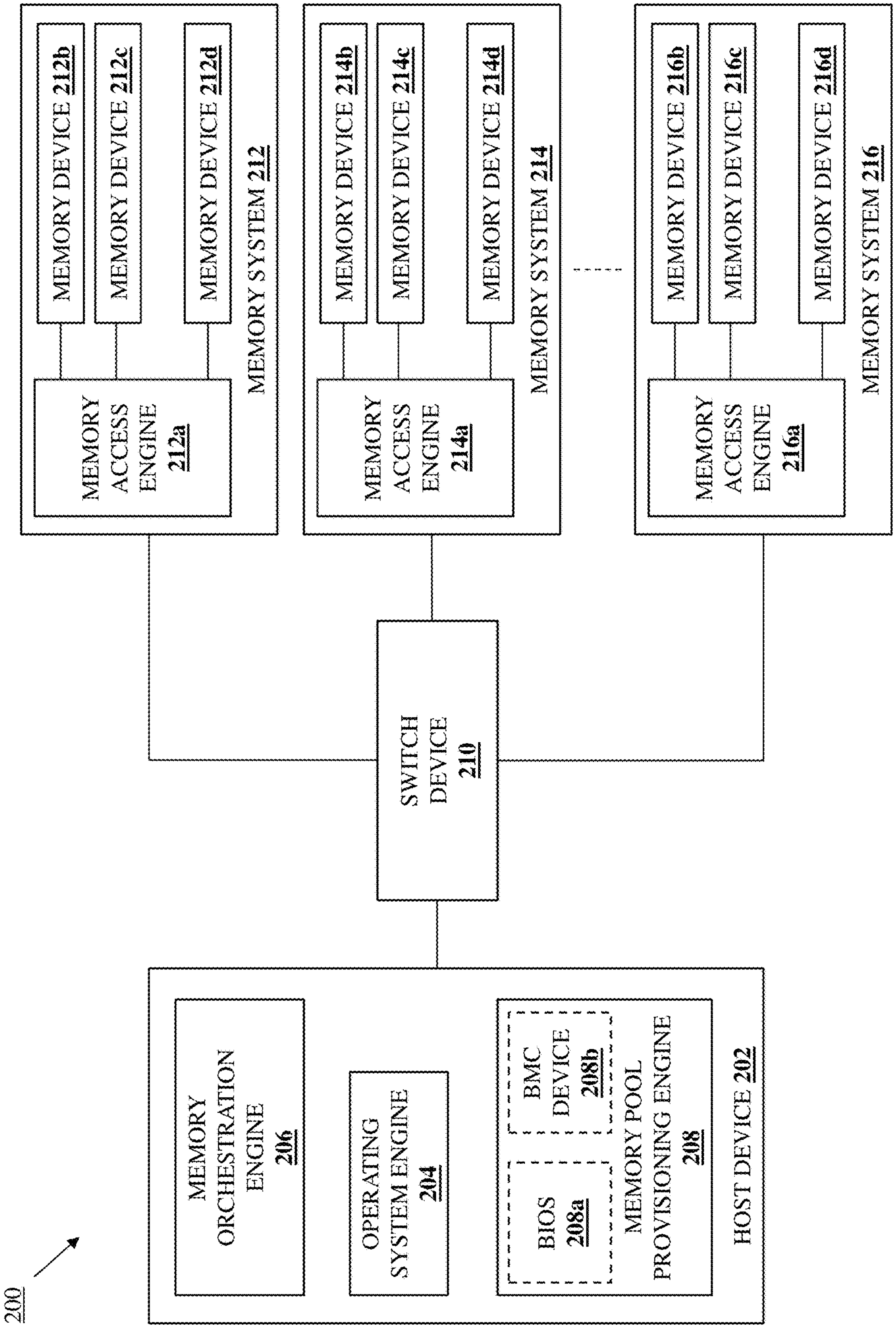
FIG. 2 is a schematic view illustrating an embodiment of a networked system that may provide the workload-based network-accessible memory pool provisioning system of the present disclosure.

Referring now to FIG. 2, an embodiment of a networked system 200 is illustrated. In the illustrated embodiment, the networked system 200 includes a host device 202. In an embodiment, the host device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that the host device 202 may be provided by other computing devices while remaining within the scope of the present disclosure.

In the illustrated embodiment, the host device 200 may include a processing system (not illustrated, but which may include the processor 102 discussed above with reference to FIG. 1 such as, for example, a Central Processing Unit (CPU)) and a memory system (not illustrated, but which may include the memory 114 discussed above with reference to FIG. 1 such as, for example, Dynamic Random Access Memory (DRAM)) that is coupled to the processing system and that includes instructions that, when executed by the processing system, cause the processing system to provide the engines discussed below that are configured to perform the functionality of the host devices discussed below. As illustrated, the memory system may include operating system instructions that, when executed by the processing system, cause the processing system to provide an operating system engine 204 that is configured to provide an operating system for the host device 202 that performs the functionality of the operating system engines, operating systems, and/or host devices discussed below.

As also illustrated, the memory system may also include memory orchestration instructions that, when executed by the processing system, cause the processing system to provide an memory orchestration engine 206 that is configured to provide memory orchestration (e.g., a CXL memory orchestration in the examples provided below) for the host device 202 that performs the functionality of the memory orchestration engines, memory orchestration subsystems, and/or host devices discussed below. As also illustrated, the memory system may also include memory pool provisioning instructions that, when executed by the processing system, cause the processing system to provide a memory pool provisioning engine 208 that is configured to perform the functionality of the memory pool provisioning engines, memory pool provisioning subsystems, and/or host devices discussed below.

In some examples, the memory pool provisioning engine 208 may be provided by a BIOS 208*a* (illustrated in dashed lines in the figures to indicate that, in other embodiments, the BIOS 208*a* may not provide the memory pool provisioning engine 208) that one of skill in the art in possession of the present disclosure will appreciate may also be configured to perform hardware initialization during boot or other initialization of the host device 202, as well as provide runtime services for the operating system provided by the operating system engine 204 and other applications provided by the host device 202. As such, the processing system in the host device 202 may include BIOS processing firmware, and the memory system in the host device 202 may include BIOS memory firmware that includes instruction that, when executed by the BIOS processing firmware, cause the BIOS processing firmware to provide the memory pool provisioning engine 208.

In other examples, the memory pool provisioning engine 208 may be provided by a BMC device 208*b* (illustrated in dashed lines in the figures to indicate that, in other embodiments, the BMC device 208*b* may not provide the memory pool provisioning engine 208) that one of skill in the art in possession of the present disclosure will appreciate may also be configured to provide an Out-Of-Band (OOB) management platform that uses separate resources from the host device 202 to provide a browser-based interface or Command Line Interface (CLI) for managing and monitoring hardware in the host device 202. As such, the processing system in the host device 202 may include BMC processing device, and the memory system in the host device 202 may include BMC memory device that includes instruction that, when executed by the BMC processing device, cause the BMC processing device to provide the memory pool provisioning engine 208. However, while two specific examples of the hardware that may provide the memory pool provisioning engine 208 have been provided, one of skill in the art in possession of the present disclosure will appreciate how the memory pool provisioning engine 208 may be provided in other manners that will fall within the scope of the present disclosure as well.

Furthermore, while a specific host device 202 has been illustrated and described, one of skill in the art in possession of the present disclosure will recognize that host devices (or other devices operating according to the teachings of the present disclosure in a manner similar to that described below for the host device 202) may include a variety of components and/or component configurations for providing conventional host device functionality, as well as the workload-based network-accessible memory pool provisioning functionality discussed below, while remaining within the scope of the present disclosure as well.

As illustrated, the host device 202 may be coupled to a switch device 210. In the illustrated embodiment, the switch device 210 may be provided by the IHS 100 discussed above with reference to FIG. 1, and/or may include some or all of the components of the IHS 100, and in specific examples may be provided by a CXL Peripheral Component Interconnect express (PCIe) switch device that one of skill in the art in possession of the present disclosure will appreciate may be configured to provide the host device 202 access to the network-accessible memory devices described below while being optimized for CXL memory device sharing such that host device/memory device connections and memory resource sharing may be performed relatively quickly. However, while illustrated and discussed as being provided by a particular switch device, one of skill in the art in possession of the present disclosure will recognize that the switch device 210 may be provided by other networking device(s) while remaining within the scope of the present disclosure.

As illustrated, a plurality of memory systems 212, 214, and up to 216 may be coupled to the switch device 210. As will be appreciated by one of skill in the art in possession of the present disclosure, each of the memory systems may be provided in respective "host devices" that are configured to share those memory systems with the host device 220 as described below, may be provided by "stand-alone" memory systems that are available for use by the host device 202, and/or may be provided in a variety of other manner that one of skill in the art in possession of the present disclosure will appreciate will enable the functionality described below. Each of the memory systems 212-216 may include a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide a memory access engine that is configured to perform the functionality of the memory access engines, memory access subsystems, and/or memory systems discussed below. As such, the memory system 212 may include a memory access engine 212*a*, the memory system 214 may include a memory access engine 214*a*, and the memory system 216 may include a memory access engine 216*a*.

Furthermore, each of the memory systems 212-216 may include a plurality of memory devices that are each coupled to the memory access engine (e.g., via a coupling between that memory device and the processing system that provides that memory access engine). As such, the memory system 212 may include a plurality of memory devices 212*b*, 212*c*, and up to 212*d*, each of which is coupled to the memory access engine 212*a*; the memory system 214 may include a plurality of memory devices 214*b*, 214*c*, and up to 214*d*, each of which is coupled to the memory access engine 214*a*; and the memory system 216 may include a plurality of memory devices 216*b*, 216*c*, and up to 216*d*, each of which is coupled to the memory access engine 216*a*.

In the specific examples provided below, the memory devices 212*b*-212*d*, 214*b*-214*d*, and 216*b*-216*d*, may be provided by CXL memory devices that are either "type 1" CXL memory devices, "type 2" CXL memory devices, or "type 3" CXL memory devices. As will be appreciated by one of skill in the art in possession of the present disclosure, "type 1" CXL memory devices may utilize the "CXL.io" protocol, which is used to handle device discovery, initialization, configuration, and Input/Output (IO) operations, while utilizing a non-coherent load/store interface that does not maintain cache coherency; and may also utilize the "CXL.cache" protocol to provide caching and cache coherency, while providing relatively low latency access to its memory (e.g., for use in high-performance computing tasks as described below).

As will be appreciated by one of skill in the art in possession of the present disclosure, "type 2" CXL memory devices may utilize the "CXL.io" protocol and "CXL.cache" protocol discussed above, as well as the "CXL.mem" protocol that provides coherent access to its memory (both volatile memory (e.g., DRAM) and persistent non-volatile memory (e.g., flash memory)), while ensuring memory coherency (e.g., ensuring any changes made to its memory by the host device 202 and the CXL memory device are immediately visible to both).

As will be appreciated by one of skill in the art in possession of the present disclosure, "type 3" CXL memory devices may utilize the "CXL.io" protocol and "CXL.mem" protocol discussed above to allow access and management of its memory (as well as memory expansion boards and persistent memory), while providing relatively low latency access to local DRAM or byte-addressable non-volatile storage. However, while specific memory systems 212-216 have been illustrated and described, one of skill in the art in possession of the present disclosure will recognize that memory systems used with the present disclosure may include a variety of components and/or component configurations for providing conventional network-accessible memory system functionality, as well as the workload-based network-accessible memory pool provisioning functionality discussed below, while remaining within the scope of the present disclosure as well.

Figure 3:
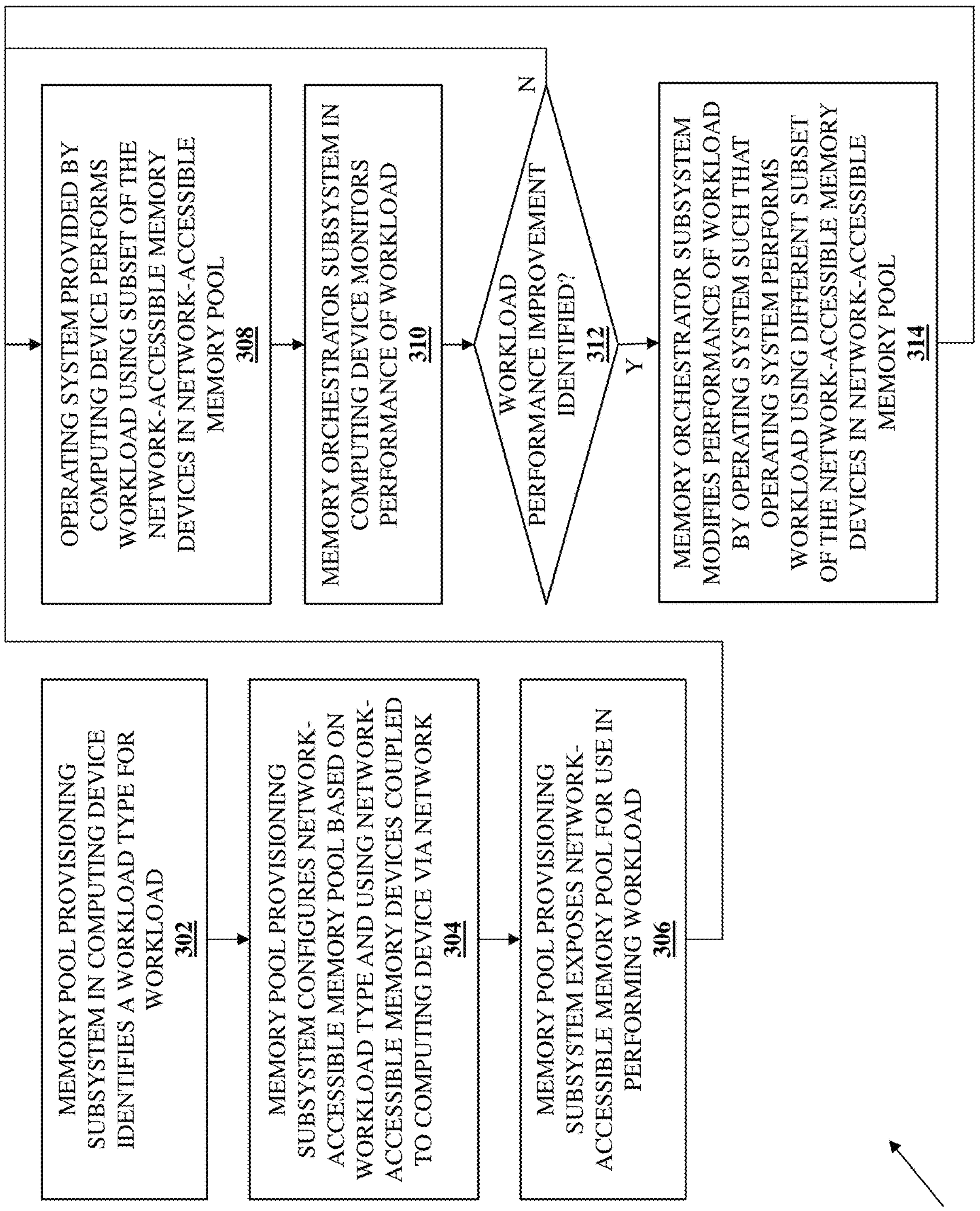
FIG. 3 is a flow chart illustrating an embodiment of a method for providing a network-accessible memory pool based on a workload performed by a computing device.

Referring now to FIG. 3, an embodiment of a method 300 for providing a network-accessible memory pool based on a workload performed by a computing device is illustrated. As discussed below, the systems and methods of the present disclosure provide for the configuration of a network-accessible memory pool for use in performing a workload based on a workload type of that workload, and the monitoring of the performance of that workload for use in modifying the network-accessible memory devices that are used to perform that workload. For example, the workload-based network-accessible memory pool provisioning system of the present disclosure may include a computing device. A memory pool provisioning subsystem in the computing device identifies a workload type for a workload and, based on the workload type, configures a network-accessible memory pool using network-accessible memory devices coupled to the computing device via a network, and exposes the network-accessible memory pool for use in performing the workload. An operating system provided by the computing device uses the exposed network-accessible memory pool to perform the workload using a first subset of the network-accessible memory devices. A memory orchestration subsystem in the computing device monitors the performance of the workload by the operating system and, in response, modifies the performance of the workload by the operating system such that the operating system performs the workload using a second subset of the network-accessible memory devices that is different than the first subset of the network-accessible memory devices. As such, the full benefits provided via the use of network accessible memory devices may be taken advantage of when performing workloads.

Figure 4:
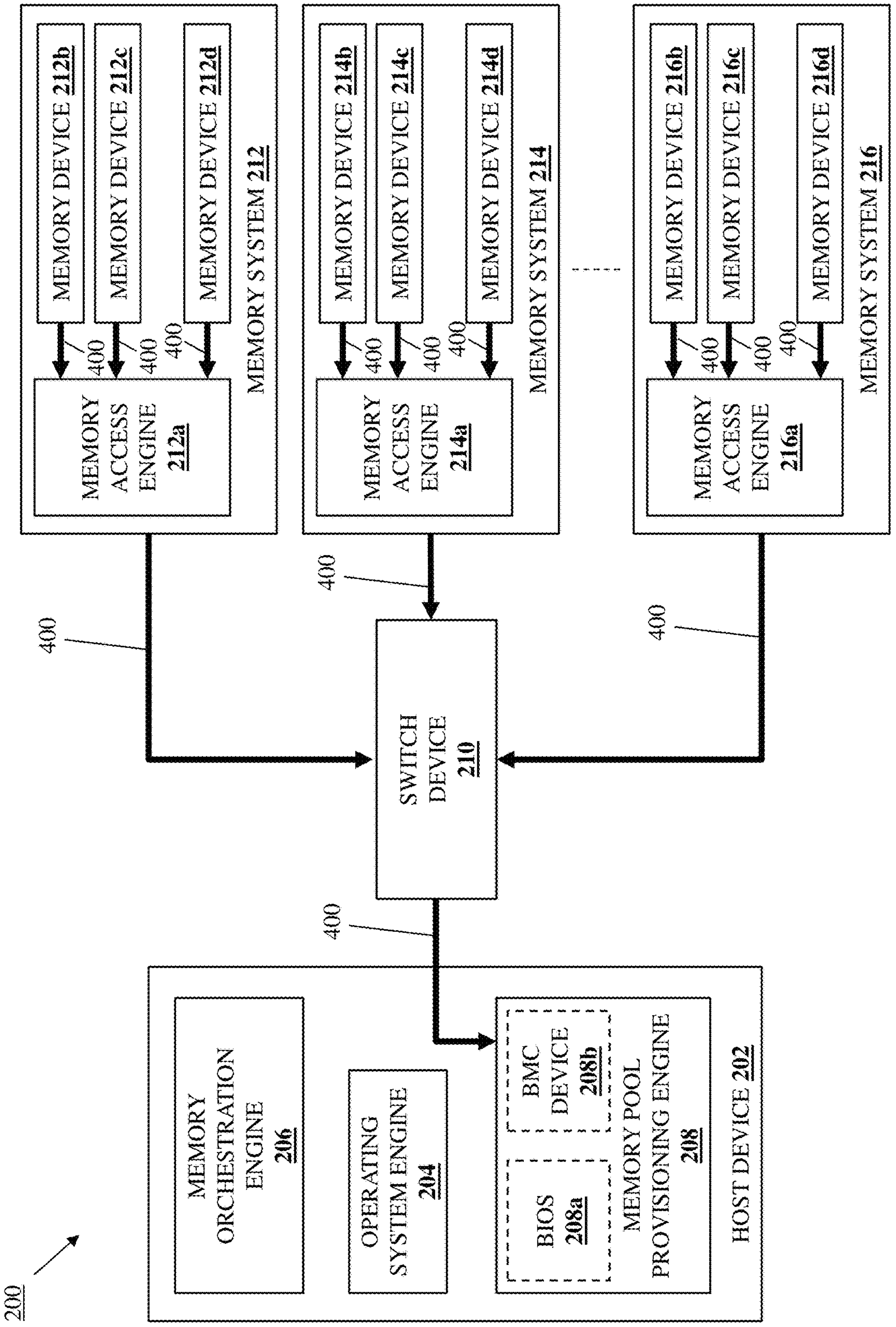
FIG. 4 is a schematic view illustrating an embodiment of the networked system of FIG. 4 operating during the method of FIG. 3.

With reference to FIG. 4, prior to and/or during the method 300, the memory pool provisioning engine 208 in the host device 202 may perform network-accessible memory device information retrieval operations 400 that include retrieving, via the switch device 210 and the memory access engines 212*a*-216*a* in the memory systems 212-216, respectively, memory device information from each of the memory devices 212*b*-212*d*, 214*b*-214*d*, and 216*b*-216*d*. In an embodiment, the memory device information retrieved from the memory devices 212*b*-212*d*, 214*b*-214*d*, and 216*b*-216*d* may identify a memory device type of that memory device (e.g., the "type 1", "type 2", or "type 3" CXL memory devices described above), a memory type of the memory provided on that memory device (e.g., High Bandwidth Memory (HBM), Double Data Rate (DDR) memory, Synchronous Dynamic Random Access Memory (SDRAM), etc.), a processor type of a processor provided with that memory device (e.g., a processor provided with the memory system (which may be a "compute node")), one or more processor capabilities (e.g. processing frequency, processing throughput, internal cache capabilities, cache type, processing memory size, processing memory type, and/or other processor capabilities of a processor provided with that memory device that one of skill in the art in possession of the present disclosure will recognize may be indicative of, for example, Artificial Intelligence (AI)/Machine Learning (ML) capabilities of a processor provided with that memory device and/or other processor capabilities known in the art), and/or other memory device information that one of skill in the art in possession of the present disclosure would recognize as enabling the functionality described below.

Figure 5:
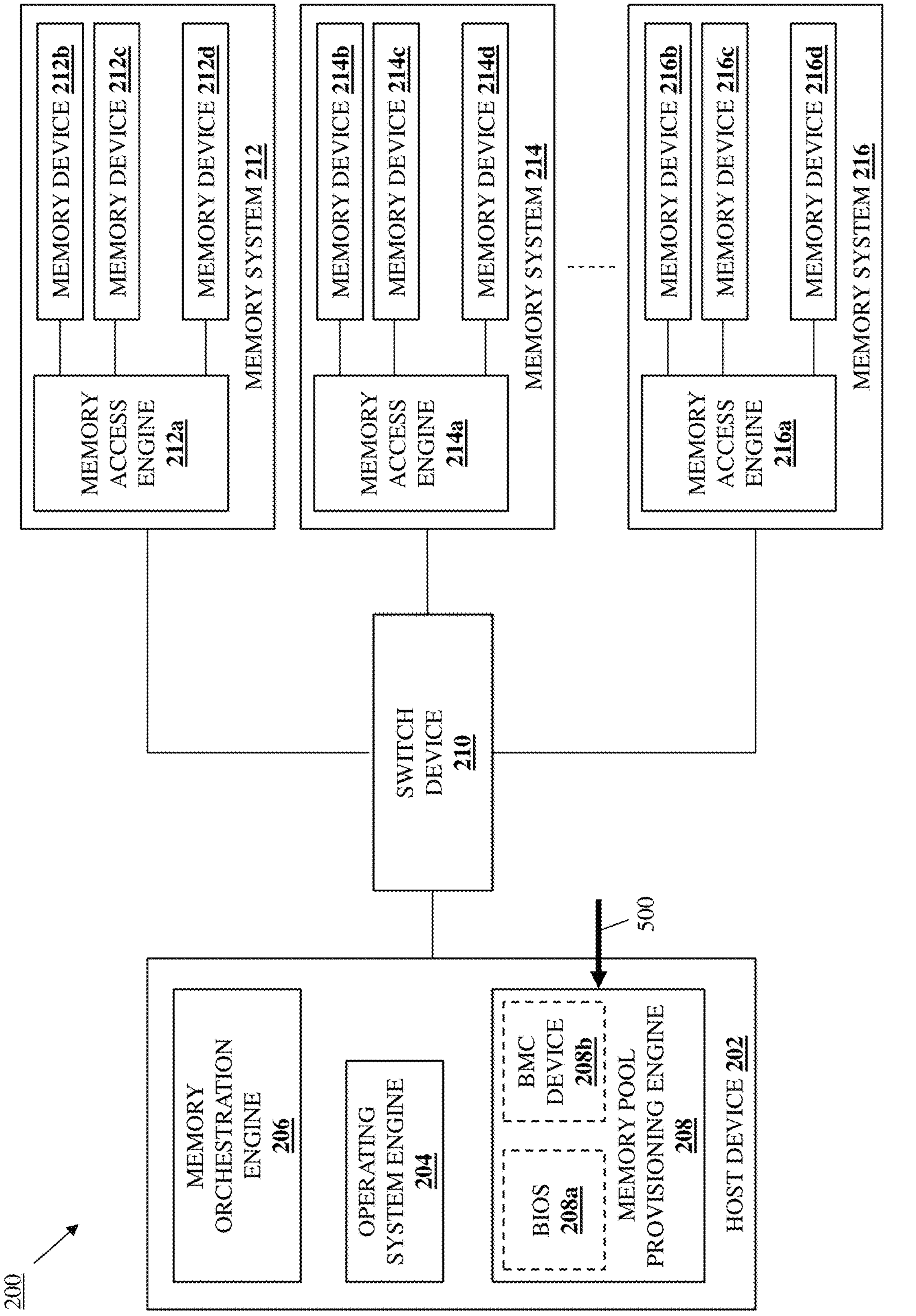
FIG. 5 is a schematic view illustrating an embodiment of the networked system of FIG. 4 operating during the method of FIG. 3.

The method 300 begins at block 302 where a memory pool provisioning subsystem in a computing device identifies a workload type for a workload. With reference to FIG. 5, in an embodiment of block 302, the memory pool provisioning engine 208 in the host device 202 may perform workload type identification operations 500 that include receiving a workload type identifier that identifies a workload type of a workload that will be performed by the operating system provided by the operating system engine 204 in the host device 202.

In embodiments in which the BIOS 208*a* provides the memory pool provisioning engine 208, the BIOS 208 may provide a BIOS setup user interface during the boot or other initialization of the host device 202, with the BIOS setup user interface configured to allow a user to identify a workload type of a workload that will be performed using the host device 202. In other embodiments in which the BMC device 208*b* provides the memory pool provisioning engine 208, the BMC device 208*b* may provide a BMC user interface that is configured to allow a user to identify a workload type of a workload that will be performed using the host device 202.

In an example, the workload type identified at block 302 may be for application development and testing workloads that may utilize any of a variety of development tools and applications that would be apparent to one of skill in the art in possession of the present disclosure. In another example, the workload type identified at block 302 may be for business application workloads that may perform enterprise resource management, Human Resources (HR)/human capital management, and supply chain management customer relationship management that would be apparent to one of skill in the art in possession of the present disclosure, and/or may utilize industry/company-specific business applications that would be apparent to one of skill in the art in possession of the present disclosure.

In another example, the workload type identified at block 302 may be for data management and analysis workloads that may perform business intelligence/data analytics, structured database/data management, and text and media analytics that would be apparent to one of skill in the art in possession of the present disclosure, and/or may utilize unstructured database and AI lifecycle platforms that would be apparent to one of skill in the art in possession of the present disclosure. In another example, the workload type identified at block 302 may be for email/collaborative/content application workloads that may utilize enterprise email, collaborative applications, social platforms, content applications, and content delivery software that would be apparent to one of skill in the art in possession of the present disclosure. In another example, the workload type identified at block 302 may be for infrastructure workloads that may perform networking, security, and client computing that would be apparent to one of skill in the art in possession of the present disclosure, and/or may utilize infrastructure that would be apparent to one of skill in the art in possession of the present disclosure.

In another example, the workload type identified at block 302 may be for technical application workloads that may utilize engineering/technical applications that would be apparent to one of skill in the art in possession of the present disclosure. In another example, the workload type identified at block 302 may be for digital services workloads that may perform consumer oriented digital services that would be apparent to one of skill in the art in possession of the present disclosure. In another example, the workload type identified at block 302 may be for Artificial Intelligence/Machine Learning (AI/ML) workloads that may perform AI training, AI inferencing, and/or any other AI/ML operations that would be apparent to one of skill in the art in possession of the present disclosure. In another example, the workload type identified at block 302 may be for media processing workloads that may perform audio, image, and video processing, and/or other media processing operations that would be apparent to one of skill in the art in possession of the present disclosure. However, while several specific workload types have been described, one of skill in the art in possession of the present disclosure will appreciate how any of a variety of workload types may be identified at block 302 while remaining within the scope of the present disclosure as well.

In some embodiments the BIOS setup user interface or the BMC user interface described above may also be configured to allow a user to identify network-accessible memory pool characteristics that are desired by the user for a memory pool that will be used by the operating system to perform the workload (e.g., the user may identify a preferred memory type for the memory (e.g., DDR-memory-only, DDR memory and HPM memory, HPM-memory-only, etc.) included in the network-accessible memory devices that will provide the network-accessible memory pool used to perform the workload), to identify a desired memory speed (e.g., a minimum read and/or write speed, latency, etc.), to identify a Corrected Platform Error Rate (CPER) (e.g., a maximum CPER), etc., and one of skill in the art in possession of the present disclosure will appreciate how any of a variety of network-accessible memory pool characteristics may be identified to the memory pool provisioning engine 208 at block 302 while remaining within the scope of the present disclosure.

The method 300 then proceeds to block 304 where the memory pool provisioning subsystem configures a network-accessible memory pool based on the workload type and using network-accessible memory devices that are coupled to the computing device via a network. In an embodiment, at block 304, the memory pool provisioning engine 208 may perform memory pool provisioning operations that may include configuring a memory pool that is based on the workload type identified at block 302 and that uses a subset of the memory devices 212*b*-212*d*, 214*b*-214*d*, and 216*b*-216*d* in the memory systems 212, 214, and 216, respectively, that are coupled to the host device 202 via the switch device 202. In the specific examples provided below, a subset of the memory devices 212*b*-212*d*, 214*b*-214*d*, and 216*b*-216*d* that include the memory device 212*b* in the memory system 212, the memory device 214*d* in the memory system 214, and the memory device 216*c* in the memory system 216 are configured for use as the network-accessible memory pool at block 304 based on the workload type identified at block 302, but one of skill in the art in possession of the present disclosure will appreciate how any subset of the memory devices 212*b*-212*d*, 214*b*-214*d*, and 216*b*-216*d* in the memory systems 212, 214, and 216, respectively, may be configured for use as the network-accessible memory pool based on the workload type identified at block 302 while remaining within the scope of the present disclosure.

In an embodiment, at block 304, the memory pool provisioning engine 208 in the host device 202 may identify subsets of the memory devices 212*b*-212*d*, 214*b*-214*d*, and 216*b*-216*d* in the memory systems 212, 214, and 216, respectively, that are a memory device type that provides workload performance benefits for the workload type identified at block 302 over the performance of that workload type using other memory device types. To provide a specific example, the memory pool provisioning engine 208 may use the table below to identify the "type 1", "type 2", and/or "type 3" CXL memory devices discussed above for the different workload types discussed above:

| | WORKLOAD TYPE | | |
|---|---|---|---|
| | TYPE 1 CXL | TYPE 2 CXL | TYPE 3 CXL |
| Application development and testing | — | — | X |
| Business application | — | — | — |
| Data management and analytics | X | X | X |
| Email/collaborative/content application | — | — | — |
| Infrastructure | — | — | — |
| Technical application | — | — | — |
| Digital services | — | — | X |
| AI/ML | X | X | X |
| Media processing | — | X | X |

As will be appreciated by one of skill in the art in possession of the present disclosure, the "X's" in the table above in CXL memory device type columns for any row identifying a workload type indicate that corresponding CXL memory device type(s) of CXL memory devices provide workload performance benefits for that workload type over the performance of that workload type using other CXL memory device types (i.e., the CXL memory device types identified by "-'s" in the table above in CXL memory device type columns for any row identifying a workload type. As such, the table provides for the use of "type 3" CXL memory devices with application development and testing workloads; "type 1", "type 2", and "type 3" CXL memory devices with data management and analytics workloads; "type 3" CXL memory device with digital services workloads; "type 1", "type 2", and "type 3" CXL memory devices with AI/ML workloads; and "type 2" and "type 3" CXL memory devices with media processing workloads; while providing for the use of any of the "type 1", "type 2", and "type 3" CXL memory devices with business application workloads, email/collaborative/content application workloads, infrastructure workloads, and technical application workloads.

For example, for workload types provided by development tools and applications and digital services, memory expansion may be a priority over cache coherency, and thus "type 3" CXL memory devices may be utilized over "type 1" and "type 2" CXL memory devices. Similarly, for workload types provided by digital services, memory expansion, host access of memory, memory device access of host memory, and cache coherency may be a priority, and thus "type 2" and "type 3" CSL memory devices may be utilized over "type 1" CXL memory devices. However, while two specific examples have been provided, one of skill in the art in possession of the present disclosure will appreciate how memory devices may be utilized for particular workloads for a variety of reasons that will fall within the scope of the present disclosure.

Thus, in some embodiments of the specific example provided below, the memory pool provisioning engine 208 may configure at least the memory devices 212*b* and 212*c* in the memory system 212, the memory devices 214*b* and 214*d* in the memory system 214, and the memory device 216*c* in the memory system 216 for use as the network-accessible memory pool at block 304 based only on those memory devices having a memory device type indicated in the table above for the workload type identified at block 302. However, in other embodiments of the specific example provided below, the memory pool provisioning engine 208 may configure at least the memory devices 212*b* and 212*c* in the memory system 212, the memory devices 214*b* and 214*d* in the memory system 214, and the memory device 216*c* in the memory system 216 for use as the network-accessible memory pool at block 304 based on those memory devices having a memory device type indicated in the table above for the workload type identified at block 302, and based on those memory devices satisfying at least some of the network-accessible memory pool characteristics provided at block 302 as described above (e.g., a preferred memory type, a desired memory speed, a Corrected Platform Error Rate (CPER), etc.).

However, while a few specific examples of the configuration of network-accessible memory devices for use in providing a network-accessible memory pool have been provided, one of skill in the art in possession of the present disclosure will appreciate how the configuration of the network-accessible memory pool based on a workload type for a workload that will be performed using that network-accessible memory pool (as well as network-accessible memory pool characteristics that may be provided by a user) may be performed in other manners while remaining within the scope of the present disclosure. For example, while the use of only the memory devices 212*b* and 212*c* in the memory system 212, the memory devices 214*b* and 214*d* in the memory system 214, and the memory device 216*c* in the memory system 216 is illustrated and described below, one of skill in the art in possession of the present disclosure will appreciate how the subset of available network-accessible memory devices configured for use in providing the network-accessible memory pool may include others of the memory devices 212*b*-212*d*, 214*b*-214*d*, and 216*b*-216*d* in the memory systems 212, 214, and 216, respectively, while remaining within the scope of the present disclosure as well.

Figure 6:
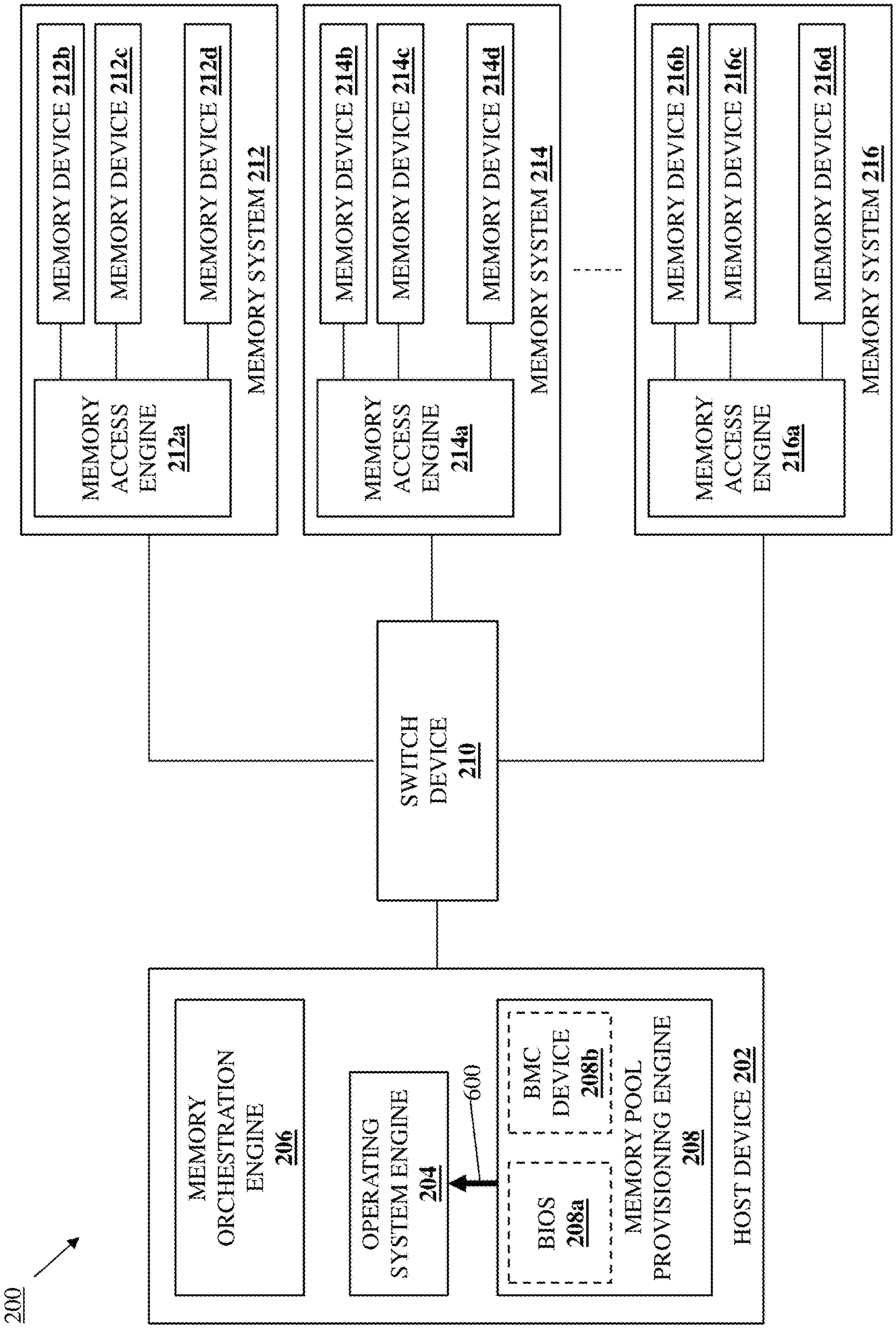
FIG. 6 is a schematic view illustrating an embodiment of the networked system of FIG. 4 operating during the method of FIG. 3.

The method 300 then proceeds to block 306 where the memory pool provisioning subsystem exposes the network-accessible memory pool for use in performing the workload. With reference to FIG. 6, in an embodiment of block 306, the memory pool provisioning engine 208 in the host device 202 may perform network-accessible memory pool exposing operations 600 that include exposing the network-accessible memory pool to the operating system provided by the operating system engine 204. For example, at block 306, the memory pool provisioning engine 208 may expose the network-accessible memory pool by publishing a memory profile (e.g., a CXL memory profile) that identifies the network-accessible memory pool and that uses information included in at least one Advanced Configuration and Power Interface (ACPI) table.

As will be appreciated by one of skill in the art in possession of the present disclosure, the memory profile may include information that is published in the at least one ACPI table (e.g., a System Resource Affinity Table (SRAT), a System Locality Information Table (SLIT), a Heterogeneous Memory Attribute Table (HMAT), etc.) such as latency information, memory range information, and/or any other relatively "lower level" details about the memory devices in the network-accessible memory pool that was configured at block 304 and that would be apparent to one of skill in the art in possession of the present disclosure, and that memory profile may be configured for use by the operating system engine 204 to utilize the network-accessible memory pool as described below. However, while a specific example of the exposure of a network-accessible memory pool to an operating system has been described, one of skill in the art in possession of the present disclosure will appreciate how the network-accessible memory pool may be identified to the operating system engine 204 in a variety of manners that will fall within the scope of the present disclosure as well.

Figure 7:
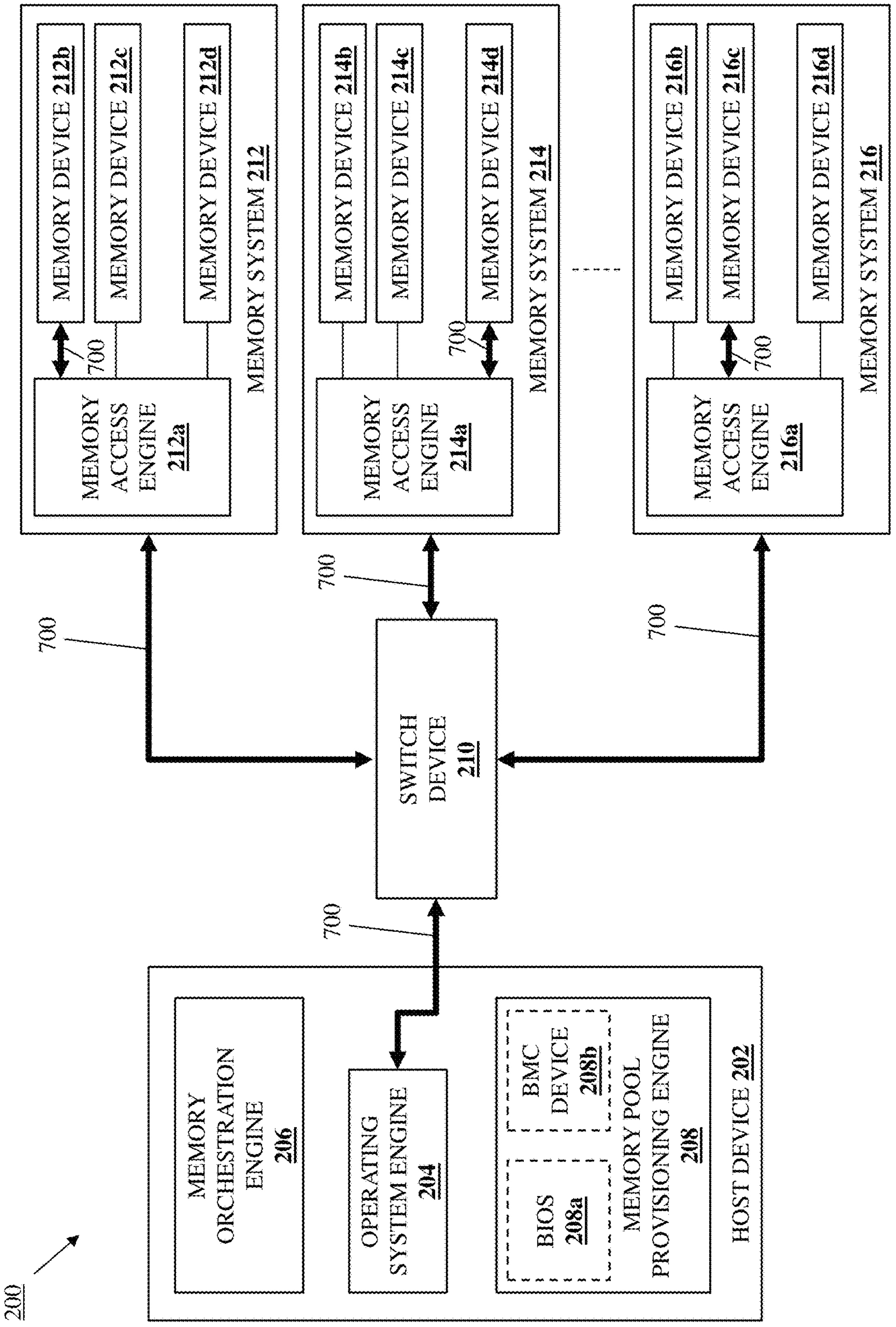
FIG. 7 is a schematic view illustrating an embodiment of the networked system of FIG. 4 operating during the method of FIG. 3.

The method 300 then proceeds to block 308 where an operating system provided by the computing device performs the workload using a subset of the network-accessible memory devices in the network-accessible memory pool. With reference to FIG. 7, in an embodiment of block 308, the operating system provided by the operating system engine 204 may utilize the network-accessible memory pool exposed by the memory pool provisioning engine 208 as described above to perform workload performance operations 700 that, as can be seen in the specific example illustrated in FIG. 7, includes utilizing the memory device **212*b* in the memory system 212, the memory device 214*d* in the memory system 214, and the memory device 216*c* in the memory system 216 via the switch device 210** to store data, access data, and/or perform any other memory operations that would one of skill in the art in possession of the present disclosure would recognize as being part of the performance of a workload.

In some examples, the network-accessible memory pool exposed by the memory pool provisioning engine 208 in the host device 202 may identify the memory device **212*b* in the memory system 212, the memory device 214*d* in the memory system 214, and the memory device 216*c* in the memory system 216 for use by the operating system in initially performing the workload as described above. In other examples, the operating system provided by the operating system engine 204 may select the memory device 212*b* in the memory system 212, the memory device 214*d* in the memory system 214, and the memory device 216*c* in the memory system 216 from the network-accessible memory pool exposed by the memory pool provisioning engine 208** for initial performance of the workload using any of a variety of memory device selection criteria that would be apparent to one of skill in the art in possession of the present disclosure.

In a specific example using the "type 3" CXL devices described above, the identification or selection of the subset of "type 3" CXL memory devices from the network-accessible memory pool to perform the workload may be based on the type of memory used by the "type 3" CXL memory devices in the network-accessible memory pool, the memory usage/current load on the "type 3" CXL memory devices in the network-accessible memory pool, the latency of read and/or write operations for the "type 3" CXL memory devices in the network-accessible memory pool, the Corrected Platform Error Rate (CPER) of the "type 3" CXL memory devices in the network-accessible memory pool (e.g., any of which may be identified via the "CXL.io" protocol described above), as well as a performance comparison of memory regions available on any particular "type 3" CXL memory device, and a performance comparison between available "type 3" CXL memory devices.

In another specific example using the "type 2" CXL devices described above, the identification or selection of the subset of "type 2" CXL memory devices from the network-accessible memory pool to perform the workload may be based on a processor type of the processors provided with the "type 2" CXL memory devices in the network-accessible memory pool, the processing capability of the processors provided with the "type 2" CXL memory devices in the network-accessible memory pool to offload/accelerate processes for the workload (e.g., AI/ML-capable processors may be identified via processing frequency, processing throughput, processor internal caches, processor cache types, processor memory size, processor memory type, etc.), as well as the availability of "type 3" CXL memory devices in the network-accessible memory pool to leverage additional memory space in the event the "type 2" CXL memory device(s) run out of memory space.

In another specific example using the "type 1" CXL devices described above, the identification or selection of the subset of "type 1" CXL memory devices from the network-accessible memory pool to perform the workload may be based on the type of memory used by the "type 1" CXL memory devices in the network-accessible memory pool, the memory usage/current load on the "type 1" CXL memory devices in the network-accessible memory pool, the latency of read and/or write operations for the "type 1" CXL memory devices in the network-accessible memory pool, the Corrected Platform Error Rate (CPER) of the "type 1" CXL memory devices in the network-accessible memory pool (e.g., any of which may be identified via the "CXL.io" protocol described above), as well as a performance comparison of memory regions available on any particular "type 1" CXL memory device, and a performance comparison between available "type 1" CXL memory devices.

As such, one of skill in the art in possession of the present disclosure will appreciate how the network-accessible memory devices in the network-accessible memory pool may include memory type(s) that match (or most closely match relative to other network-accessible memory devices) the requirements of the workload type of a workload that will be performed, and particular network-accessible memory devices having those memory type(s) may be selected from the network-accessible memory pool based on those network-accessible memory devices matching (or most closely matching relative to other network-accessible memory devices) workload performance requirements, workload security requirements, workload redundancy requirements, workload availability requirements, and/or other requirements of that workload. However, while a few specific examples are provided, one of skill in the art in possession of the present disclosure will appreciate how the workload may initially be performed by the operating system using memory devices selected from the network-accessible memory pool in a variety of manners while remaining within the scope of the present disclosure as well.

Figure 8:
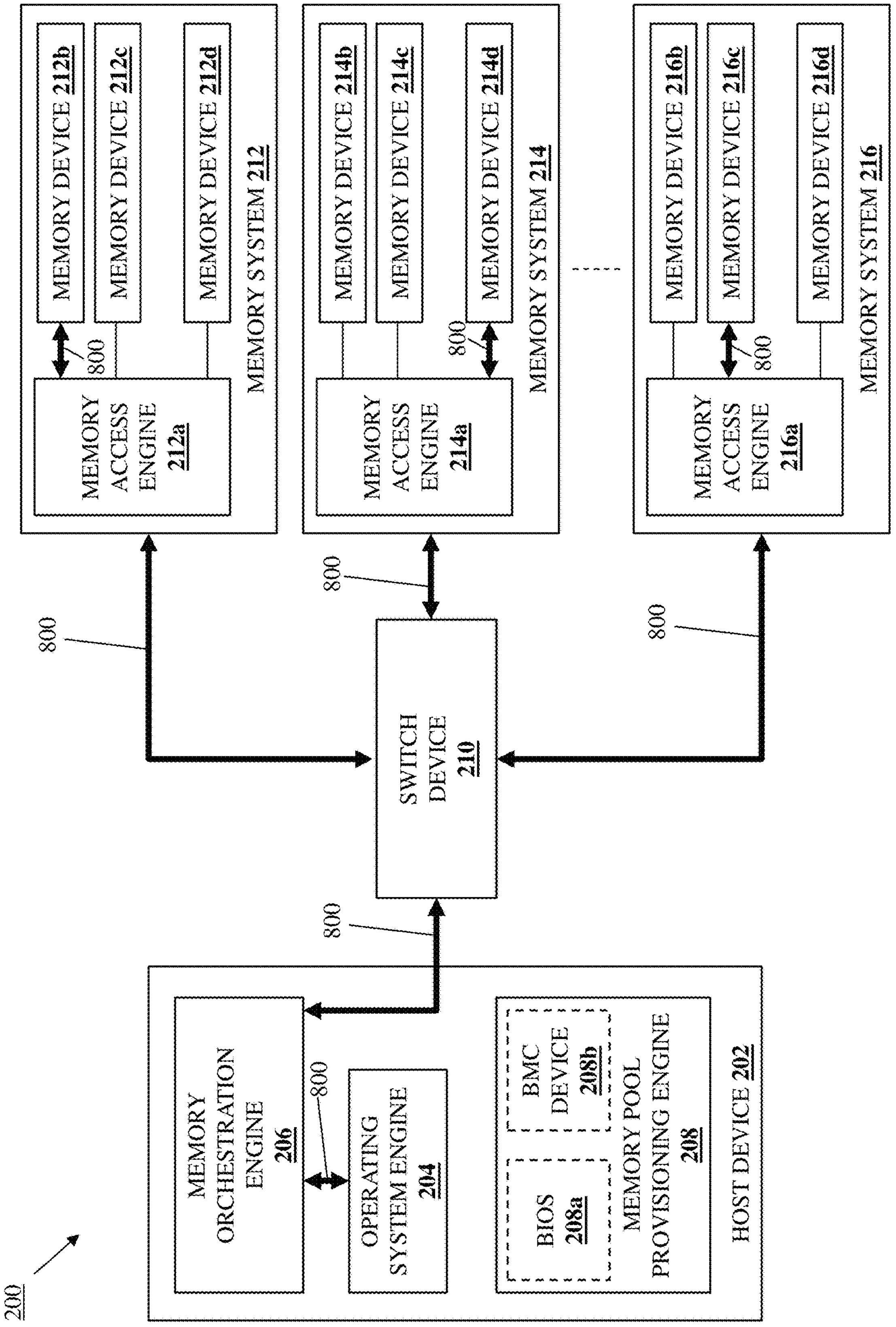
FIG. 8 is a schematic view illustrating an embodiment of the networked system of FIG. 4 operating during the method of FIG. 3.

The method 300 then proceeds to block 310 where a memory orchestration subsystem in the computing device monitors performance of the workload. With reference to FIG. 8, in an embodiment of block 310, the memory orchestration engine 206 in the host device 202 may perform monitoring operations 800 that include monitoring the performance of the workload by the operating system provided by the operating system engine 204, and monitoring (e.g., via the switch device 210 and the memory access engines 212*a*, 214*a*, and 216*a*) the use of the memory device 212*b* in the memory system 212, the memory device 214*d* in the memory system 214, and the memory device 216*c* in the memory system 216 to perform the workload. Continuing with the example in which the memory devices are CXL memory devices, the monitoring operations 800 may be performed by the memory orchestration engine 206 using the "CXL.io" protocol.

In a specific example, at block 310, the memory orchestration engine 206 may perform the monitoring operations 800 by collecting runtime statistics from the operating system engine 204, the memory device 212*b* in the memory system 212, the memory device 214*d* in the memory system 214, and the memory device 216*c* in the memory system 216 (as well as others of the memory devices 212*b*-212*d*, 214*b*-214*d*, and 216*b*-216*d* in the memory systems 212, 214, and 216, respectively, in some embodiments).

For example, runtime statistics collected from the operating system engine 204 (e.g., via one or more base utilities included in the operating system engine 204) may include an amount of memory being used, a frequency of usage of the memory devices, an amount of data being transacted using the memory devices, other operating system memory usage statistics, and/or any other operating system workload performance runtime statistics that would be apparent to one of skill in the art in possession of the present disclosure. In another example, runtime statistics collected from the memory devices (e.g. by the BMC device 208*b*) described above may include a current load or other memory usage of that memory device, a latency for read and/or write operations performed with the memory device, a Corrected Platform Error Rate (CPER) for that memory device, and/or any other memory device runtime statistics that would be apparent to one of skill in the art in possession of the present disclosure.

However, while specific examples of runtime statistics collected during the monitoring operations 800 have been described, one of skill in the art in possession of the present disclosure will appreciate how a variety of monitoring of the operating system engine 204 and the memory devices 212*b*-212*d*, 214*b*-214*d*, and 216*b*-216*d* in the memory systems 212, 214, and 216, respectively, during the performance of the workload may be performed to collect a variety of data that may be used to provide the functionality described below while remaining within the scope of the present disclosure as well.

The method 300 then proceeds to decision block 312 the method 300 proceeds depending on whether a workload performance improvement is identified. In an embodiment, at decision block 312, the memory orchestration engine 206 may identify whether a workload performance improvement is available based on the runtime statistics collected via the monitoring performed at block 310 by determining whether the one or more of the subset of the network-accessible memory devices included in the network-accessible memory pool may be replaced with a network-accessible memory device that is configured for use in providing the network-accessible memory pool but that is not currently being used to perform the workload, and one of skill in the art in possession of the present disclosure will appreciate how the runtime statistics collected from the operating system and the network-accessible memory devices as described above may be used to determine whether to replace a network-accessible memory device with another network-accessible memory device in order to perform the workload.

For example, a memory device may be replaced with a memory device of a different type (e.g., a "type 3" memory device may be replaced with a "type 1" memory device when the runtime statistics suggest that additional cache and cache coherency is needed over additional memory). In another example, a memory device may be replaced with a memory device of the same type when runtime statistics indicate that the replacement memory device will perform better than the current memory device (e.g., when its workload has moved between compute nodes). However, while two specific examples have been provided, one of skill in the art in possession of the present disclosure will appreciate how the variety of replacements of memory devices for a variety of reasons will fall within the scope of the present disclosure. If, at decision block 3012, no workload performance improvement is identified, the method 300 returns to block 308. As such, the method 300 may loop such that the operating system continues to perform the workload and the memory orchestration engine 208 continues to monitor the performance of the workload until a workload performance improvement is identified.

Figure 9:
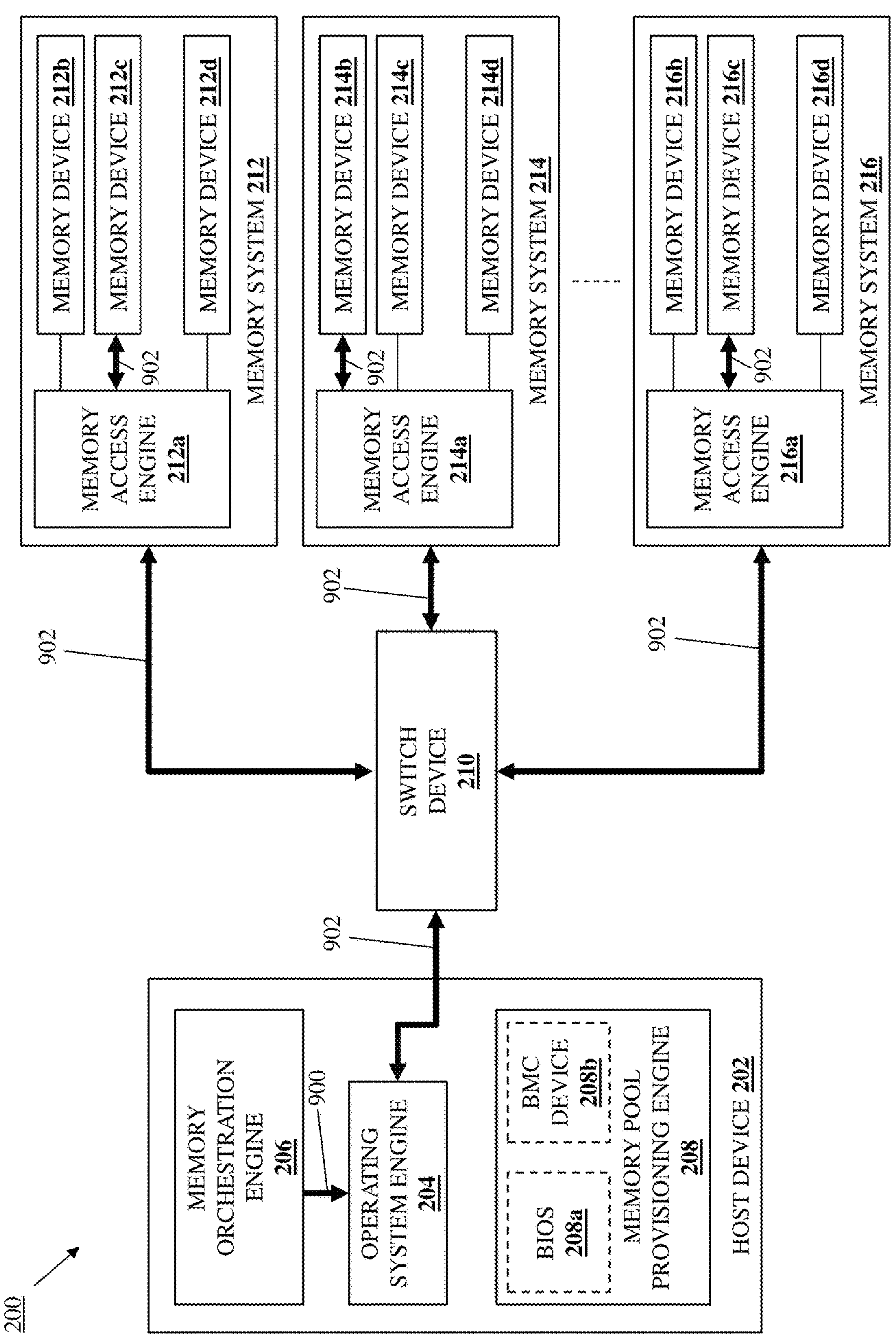
FIG. 9 is a schematic view illustrating an embodiment of the networked system of FIG. 4 operating during the method of FIG. 3.

If at decision block 312, a workload performance improvement is identified, the method 300 proceeds to block 314 where the memory orchestration subsystem modifies performance of the workload by the operating system such that the operating system performs the workload using a different subset of the plurality of network-accessible memory devices in the network-accessible memory pool. With reference to FIG. 9, in an embodiment of block 314 and in response to identifying a workload performance improvement, the memory orchestration engine 206 may perform workload performance modification operations 900 that, as discussed below, causes the operating system provided by the operating system engine 204 to utilize the network-accessible memory pool exposed by the memory pool provisioning engine 208 to modify its performance of the workload by utilizing the memory device 212*c* in the memory system 212 in place of the memory device 212*b* in the memory system 212, and utilizing the memory device 214*b* in the memory system 214 in place of the memory device 214*d* in the memory system 214.

As will be appreciated by one of skill in the art in possession of the present disclosure, provisioning by the memory orchestration engine 206 to the operating system engine 204 of the different subset of the plurality of network-accessible memory devices in the network-accessible memory pool is not seen by the operating system engine 204 or the workloads it is performing using memory devices, and it will continue to perform that workload with any "new" memory devices without knowledge of them. Thus, by virtue of providing the different subset of the plurality of network-accessible memory devices in the network-accessible memory pool, the workload is performed using "new" memory device without knowledge that any network-accessible memory devices in the network-accessible memory pool have changed.

With continued reference to FIG. 9, the method 300 then returns to block 308, with the operating system provided by the operating system engine 208 performing workload performance operations 902 that, as can be seen in the specific example illustrated in FIG. 9, includes utilizing the memory device 212*c* in the memory system 212 in place of the memory device 212*c* in the memory system 212, and utilizing the memory device 214*b* in the memory system 214 in place of the memory device 214*d* in the memory system 214 via the switch device 210, while continuing to utilize the memory device 216*c* in the memory system 216, to store data, access data, and/or perform any other memory operations that would one of skill in the art in possession of the present disclosure would recognize as being part of the performance of a workload. As such, the method 300 may loop such that the operating system continues to perform the workload using the different subset of network-accessible memory devices, and the memory orchestration engine 208 continues to monitor the performance of the workload, until another workload performance improvement is identified and the memory orchestration engine 208 causes the operating system to again change the subset of network-accessible memory devices in the network-accessible memory pool that it uses to perform the workload.

As such, one of skill in the art in possession of the present disclosure will appreciate how the network-accessible memory devices in the network-accessible memory pool that are used to perform the workload may be modified such that the network-accessible memory devices used to perform the workload match (or most closely match relative to other network-accessible memory devices) workload performance requirements, workload security requirements, workload redundancy requirements, workload availability requirements, and/or other requirements of that workload.

Thus, systems and methods have been described that provide for the configuration of a network-accessible memory pool for use in performing a workload based on a workload type of that workload, and the monitoring of the performance of that workload for use in modifying the network-accessible memory devices that are used to perform that workload. For example, the workload-based network-accessible memory pool provisioning system may include a computing device. A memory pool provisioning subsystem in the computing device identifies a workload type for a workload and, based on the workload type, configures a network-accessible memory pool using network-accessible memory devices coupled to the computing device via a network, and exposes the network-accessible memory pool for use in performing the workload. An operating system provided by the computing device uses the exposed network-accessible memory pool to perform the workload using a first subset of the network-accessible memory devices. A memory orchestration subsystem in the computing device monitors the performance of the workload by the operating system and, in response, modifies the performance of the workload by the operating system such that the operating system performs the workload using a second subset of the network-accessible memory devices that is different than the first subset of the network-accessible memory devices. As such, the full benefits provided via the use of network accessible memory devices may be taken advantage of when performing workloads.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A workload-based network-accessible memory pool provisioning system, comprising:

a computing device;

a plurality of network-accessible memory devices that are coupled to the computing device via a network and that include subsets of network-accessible memory devices having different memory device types;

a memory pool provisioning subsystem that is included in the computing device and that is configured to:

identify a first workload type for a workload that defines first memory functionality utilized when performing the first workload type;

configure, based on the first memory functionality utilized when performing the first workload type, a network-accessible memory pool using a first subset of the plurality of network-accessible memory devices that each have a first memory device type that is configured to provide workload performance benefits over the other memory device types when performing the first memory functionality for the first workload type;

expose the network-accessible memory pool for use in performing the workload;

an operating system that is provided by the computing device, that is coupled to the memory pool provisioning subsystem, and that is configured to:

perform, using the network-accessible memory pool exposed by the memory pool provisioning subsystem, the workload using at least one first network-accessible memory device in the first subset of the plurality of network-accessible memory devices; and a memory orchestration subsystem that is included in the computing device, that is coupled to the operating system, and that is configured to:

monitor the performance of the workload by the operating system and, in response, modify the performance of the workload by the operating system such that the operating system performs the workload using at least one second network-accessible memory device in the first subset of the plurality of network-accessible memory devices that is different than the at least one first network-accessible memory device in the first subset of the plurality of network-accessible memory devices.

2. The system of claim 1, wherein the memory pool provisioning subsystem is configured to:

receive at least one memory pool characteristic; and configure, based on the at least one memory pool characteristic, the network-accessible memory pool using the first subset of the plurality of network-accessible memory devices.

3. The system of claim 1, wherein the memory pool provisioning subsystem is configured to expose the network-accessible memory pool for use in performing the workload using information included in at least one Advanced Configuration and Power Interface (ACPI) table.

4. The system of claim 1, wherein the memory pool provisioning subsystem is provided by one of:

a Basic Input/Output System (BIOS); or a Baseboard Management Controller (BMC) device.

5. The system of claim 1, wherein the plurality of network-accessible memory devices are Compute eXpress Link (CXL) memory devices that include a subset of Type 1 CXL memory devices, a subset of Type 2 CXL memory devices, and a subset of Type 3 CXL memory devices.

6. The system of claim 1, wherein the monitoring the performance of the workload by the operating system includes collecting operating system statistics generated by the operating system via the performance of the workload, and memory device statistics generated by the first subset of the plurality of network-accessible memory devices during the performance of the workload.

7. An Information Handling System (IHS), comprising:

a processing system; and a memory system that is coupled to the processing system and that includes instructions that, when executed by the processing system, cause the processing system to provide a memory pool provisioning engine that is configured to:

identify a first workload type for a workload that defines first memory functionality utilized when performing the first workload type;

identify, from a plurality of network-accessible memory devices that are coupled to the processing system via a network and that include subsets of network-accessible memory devices having different memory device types, a first memory device type that is configured to provide workload performance benefits over the other memory device types when performing the first memory functionality for the first workload type;

configure, based on the first memory functionality utilized when performing the first workload type, a network-accessible memory pool using the first subset of plurality of network-accessible memory devices; and expose the network-accessible memory pool for use in performing the workload, wherein the memory system includes instructions that, when executed by the processing system, cause the processing system to provide an operating system engine that is configured to:

perform, using the network-accessible memory pool exposed by the memory pool provisioning engine, the workload using at least one first network-accessible memory device in the first subset of the plurality of network-accessible memory devices; and wherein the memory system includes instructions that, when executed by the processing system, cause the processing system to provide a memory orchestration engine that is configured to:

monitor the performance of the workload by the operating system engine and, in response, modify the performance of the workload by the operating system engine such that the operating system engine performs the workload using at least one second network-accessible memory device in the first subset of the plurality of network-accessible memory devices that is different than the at least one first network-accessible memory device in the first subset of the plurality of network-accessible memory devices.

8. The IHS of claim 7, wherein the memory pool provisioning engine is configured to:

receive at least one memory pool characteristic; and configure, based on the at least one memory pool characteristic, the network-accessible memory pool using the first subset of the plurality of network-accessible memory devices.

9. The IHS of claim 7, wherein the memory pool provisioning engine is configured to expose the network-accessible memory pool for use in performing the workload using information included in at least one Advanced Configuration and Power Interface (ACPI) table.

10. The IHS of claim 7, wherein the memory pool provisioning engine is provided by one of:

a Basic Input/Output System (BIOS); or a Baseboard Management Controller (BMC) device.

11. The IHS of claim 7, wherein the plurality of network-accessible memory devices are Compute eXpress Link (CXL) memory devices that include a subset of Type 1 CXL memory devices, a subset of Type 2 CXL memory devices, and a subset of Type 3 CXL memory devices.

12. The IHS of claim 7, wherein the monitoring the performance of the workload by the operating system engine includes collecting operating system statistics generated by the operating system engine via the performance of the workload, and memory device statistics generated by the first subset of the plurality of network-accessible memory devices during the performance of the workload.

13. The IHS of claim 7, wherein the first memory functionality includes at least one of memory expansion functionality, cache coherency functionality, host access of memory functionality, and memory device access of host memory.

14. A method for providing a network-accessible memory pool based on a workload performed by a computing device, comprising:

identifying, by a memory pool provisioning subsystem included in a computing device, a first workload type for a workload that defines first memory functionality utilized when performing the first workload type;

identifying, by the memory pool provisioning subsystem from a plurality of network-accessible memory devices that are coupled to the computing device via a network and that include subsets of network-accessible memory devices having different memory device types, a first memory device type that is configured to provide workload performance benefits over the other memory device types when performing the first memory functionality for the first workload type;

configuring, by the memory pool provisioning subsystem based on the first memory functionality utilized when performing the first workload type, a network-accessible memory pool using the first subset of plurality of network-accessible memory devices;

exposing, by the memory pool provisioning subsystem, the network-accessible memory pool for use in performing the workload;

performing, by an operating system that is provided by the computing device and that uses the network-accessible memory pool exposed by the memory pool provisioning subsystem, the workload using at least one first network-accessible memory device in the first subset of the plurality of network-accessible memory devices; and monitoring, a memory orchestration subsystem that is included in the computing device, the performance of the workload by the operating system and, in response, modifying the performance of the workload by the operating system such that the operating system performs the workload using a t least one second network-accessible memory device in the first subset of the plurality of network-accessible memory devices that is different than the at least one first network-accessible memory device in the first subset of the plurality of network-accessible memory devices.

15. The method of claim 14, further comprising:

receiving, by the memory pool provisioning subsystem, at least one memory pool characteristic; and configuring, by the memory pool provisioning subsystem based on the at least one memory pool characteristic, the network-accessible memory pool using the first subset of the plurality of network-accessible memory devices.

16. The method of claim 14, wherein the memory pool provisioning subsystem exposes the network-accessible memory pool for use in performing the workload using information included in at least one Advanced Configuration and Power Interface (ACPI) table.

17. The method of claim 14, wherein the memory pool provisioning subsystem is provided by one of:

a Basic Input/Output System (BIOS); or a Baseboard Management Controller (BMC) device.

18. The method of claim 14, wherein the plurality of network-accessible memory devices are Compute eXpress Link (CXL) memory devices that include a subset of Type 1 CXL memory devices, a subset of Type 2 CXL memory devices, and a subset of Type 3 CXL memory devices.

19. The method of claim 14, wherein the monitoring the performance of the workload by the operating system includes collecting operating system statistics generated by the operating system via the performance of the workload, and memory device statistics generated by the first subset of the plurality of network-accessible memory devices during the performance of the workload.

20. The method of claim 14, wherein the first memory functionality includes at least one of memory expansion functionality, cache coherency functionality, host access of memory functionality, and memory device access of host memory.

* * * * *